United States Patent

Backlund

[15] 3,640,698
[45] Feb. 8, 1972

[54] FERTILIZER UREA SOLUTIONS CONTAINING MICRONUTRIENTS

[72] Inventor: Peter Stanley Backlund, Anaheim, Calif.
[73] Assignee: Union Oil Company of California, Los Angeles, Calif.
[22] Filed: Mar. 19, 1970
[21] Appl. No.: 20,995

[52] U.S. Cl. .......................................... 71/29, 71/1, 71/28, 71/34, 71/64 C, 71/119
[51] Int. Cl. .................................. C05c 9/00, C05b 17/00
[58] Field of Search ....................... 71/1, 28, 29, 64 C, 64, 34

[56] References Cited

UNITED STATES PATENTS 3,130,034  4/1964  Young .......................................... 71/1
3,010,818  11/1968  Jones .......................................... 71/1 X

*Primary Examiner*—S. Leon Bashore
*Assistant Examiner*—Frederick Frei
*Attorney*—Milton W. Lee, Richard C. Hartman, Lannas S. Henderson, Dean Sandford and Robert E. Strauss

[57] ABSTRACT

A fertilizer solution for treatment of plants and soils to correct micronutrient deficiencies is disclosed and comprises an aqueous urea solution having an acidic pH value, less than 4, and containing the sulfate salts of iron, zinc or manganese. An aqueous urea-micronutrient solution containing potassium and phosphorous is also disclosed.

14 Claims, 4 Drawing Figures

INVENTOR.
PETER STANLEY BACKLUND

FERTILIZER UREA SOLUTIONS CONTAINING MICRONUTRIENTS

This invention relates to fertilizer compositions and more particularly to fertilizer solutions of water, urea and ferrous sulfate, zinc sulfate or manganese sulfate for correction of nutrient deficiencies in crops and soils.

Micronutrients are slowly depleted from agricultural soils and must ultimately be replenished in order to sustain future healthy plant growth. The most common method of replenishing these lost micronutrients is by mixing salts of the micronutrient metals with conventional, solid fertilizers and spreading the admixture on the depleted soils. Usually this requires separate storing and handling of both the minor and major nutrients at the site of application and the mixing of the two nutrients during application. Thus the present system is burdened with the storage and handling of a plurality of nutrients. Inefficient and inaccurate nutrient mixing under field conditions also frequently results in uneven application of the micronutrients to the soils.

The most commonly encountered micronutrient deficiencies in crops or soils are iron, zinc and manganese deficiencies, however, deficiencies of two or more of these metals are sometimes encountered in a single solid or crop and hence it may be necessary to mix several micronutrient metals with the fertilizer. Accordingly, need exists for a fertilizer containing micronutrients of iron, zinc or manganese that can be stored and handled in high concentrations. Preferably, for ease of handling and application, the fertilizer should be a liquid and contain the micronutrient in a solution which does not salt out during transportation or field application at normally ambient temperatures.

It is therefore an object of this invention to provide a fertilizer solution containing micronutrients.

It is another object of this invention to provide a fertilizer solution having nitrogen in major quantities and a micronutrient of iron, zinc or manganese.

It is also an object to provide a fertilizer solution having nitrogen in major quantities and containing micronutrients in high concentrations and which possess a salting out temperature of less than ambient temperatures.

Other objects will become apparent to those skilled in the art from the drawing and description thereof which follows.

The foregoing objects and their attendant advantages can be attained with a fertilizer solution comprising urea, water and ferrous sulfate, zinc sulfate, manganese sulfate or mixtures thereof provided that the pH of the aqueous solution is maintained below about 4 and preferably between about 1.5 and 4. At this pH range, the aforementioned sulfate salts form novel eutectic compositions with the aqueous urea solutions. In addition it has been found that the eutectic compositions also have enhanced solubilities for urea. This improved solubility for both the major and minor nutrients is significant in that it permits the transportation of a high concentration of liquid nutrients to the site of application for any given salting out temperature. It also permits the application of a liquid solution of the nutrients to the soil in greater concentrations than heretofore practiced by the fertilizer industry.

The solutions of this invention will be described by reference to the FIGURES representing fertilizer solutions having a pH less than 4.0 of which:

Figure 1:
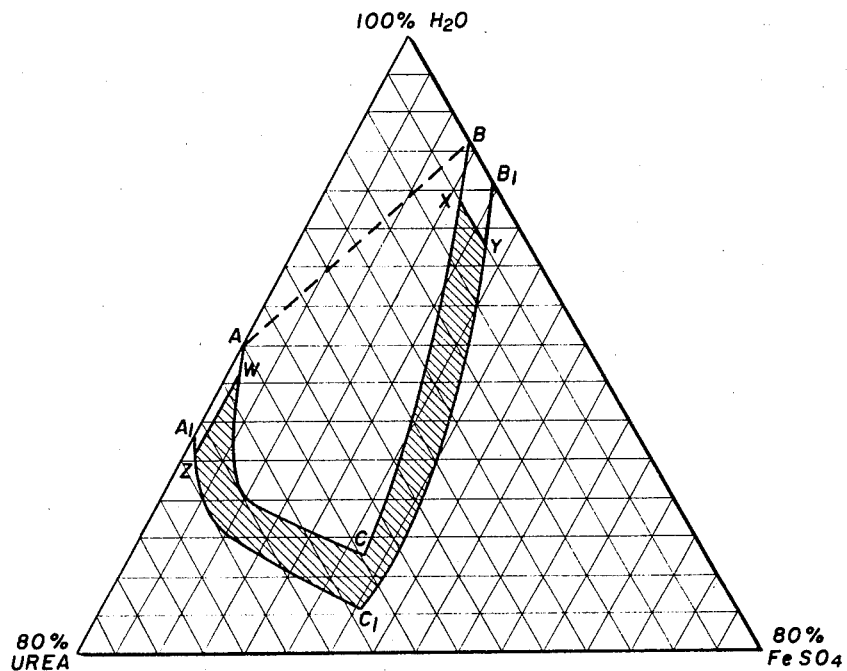
FIG. 1 is a ternary diagram of the system of urea, water and ferrous sulfate.

Referring to the FIGURES, it can be seen that the sulfate salts, urea and water form eutectic compositions having greatly enhanced solubilities for both urea and the metal solids. As illustrated, the maximum solubility or saturation solubility of urea in water at 0° C. is illustrated by point A in FIGS. 1–4. At 20° C. there is a slight increase in saturation solubility as illustrated by point $A_1$. Similarly, the saturation solubility of the sulfate salts in an aqueous solution at 0° C. is illustrated by point B and at 20° C. by point $B_1$ of the FIGURES. The broken line A–B connecting points A and B of the 0° C. isotherm represents the normally expected solubilities of these salts upon admixture of the saturated solutions. Thus, it would be expected, absent any synergistic effect on solubility exhibited by the combinations, that the solubilities of the saturated mixtures of urea and the micronutrient salts would fall along the straight line A–B. Contrary to this expectation, I have found that for systems having pH values of less than 4.0 the salts exhibit a synergistic effect on the urea solubility and the isotherm is substantially depressed, particularly for solutions containing more than about 5 weight percent of the sulfate salts. The eutectic composition appears at point C, where it can be seen that the total solute content is considerably in excess of the solubilities of either of the individual components in the acidified water. A similar effect can be illustrated at the 20° C. isotherm as represented by points $A_1$, $B_1$ and $C_1$.

Fertilizer solutions falling within the scope of this invention therefore comprise those solutions having salting out temperatures no greater than 20° C. and preferably no greater than 0° C. and comprising an aqueous solution of urea and a micronutrient salt such as manganese sulfate, zinc sulfate, ferrous sulfate or mixtures thereof and a mineral acid in a sufficient quantity to impart a pH of less than 4 to the solution. The concentration of the micronutrient in the fertilizer solutions of this invention is greater than the micronutrient concentration of a mixture of saturated aqueous solutions of urea and micronutrient for any selected urea concentration. Similarly, the concentration of urea in the fertilizer solution is greater than the urea concentration of a mixture of saturated aqueous solutions of urea and micronutrient for any selected micronutrient concentration. These solutions are illustrated by the compositions included within the area defined by lines A–B, B–$B_1$, $B_1$–$C_1$, $C_1$–$A_1$, and $A_1$–A of the FIGURES.

Other solutions embraced within the scope of this invention comprise those solutions having from about 1 to 35 weight percent and preferably from about 5 to 25 weight percent of the micronutrient salts, from 5 to about 55 weight percent and preferably from about 35 to 55 weight percent of urea and from 20 to about 60 weight percent and preferably from 20 to about 45 weight percent water having a pH of less than 4 and which exhibit salting out temperatures no greater than 20° C.

Particularly preferred fertilizer solutions comprise at least 1 weight percent micronutrient and at least 5 weight percent urea in an aqueous liquid having a pH of less than 4.0, and having a salting out temperature between about 0° C. and 20° C. These preferred compositions are shown as the shaded areas defined within the lines between points W–C, C–X, X–Y, Y–$C_1$, $C_1$–Z and Z–W in FIGS. 1–4.

Figure 2:
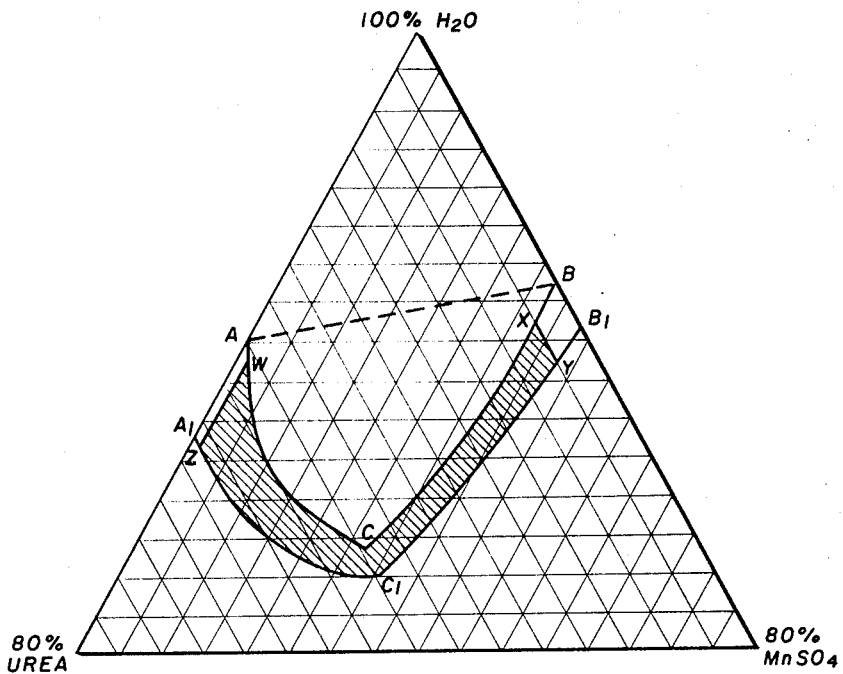
FIG. 2 is a ternary diagram for a solution of urea, water and zinc sulfate.
Figure 3:
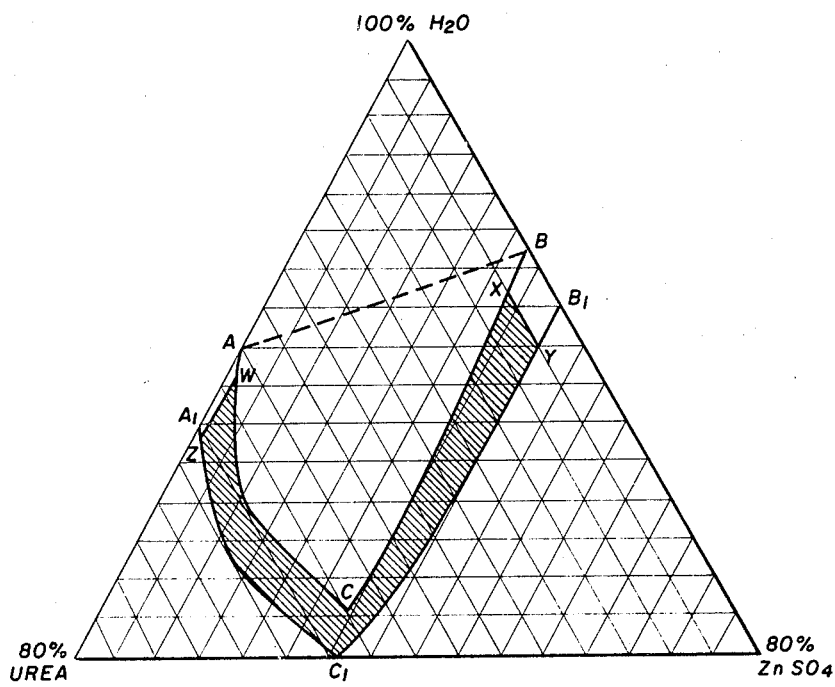
FIG. 3 is a ternary diagram for a solution of urea, water and manganese sulfate.
Figure 4:
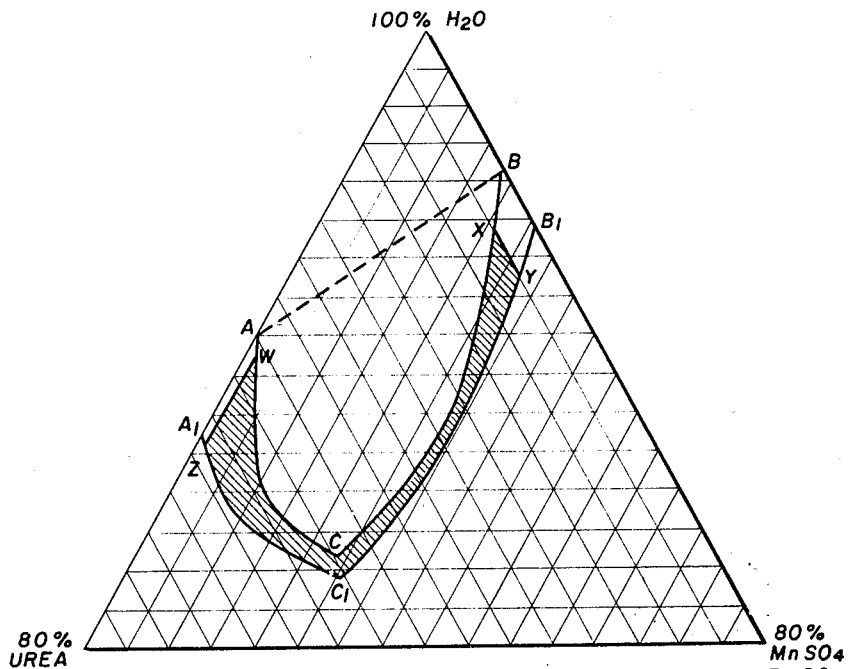
FIG. 4 is a ternary diagram for a solution of urea, water and a mixture of ferrous sulfate, zinc sulfate and manganese sulfate in the weight ratio of 1:1:1 of Fe:Zn:Mn.

FIGS. 1, 2 and 3, respectively, illustrates eutectic compositions of ferrous sulfate, manganese sulfate and zinc sulfate in acidified aqueous urea solutions, and FIG. 4 illustrates a eutectic composition of a combination of the above metal salts in an acidified aqueous urea solution. The weight ratio of iron to manganese to zinc in the latter eutectic solution is 1:1:1, however, solubilities shown in FIG. 4 are applicable to solutions containing mixtures of two or three metal salts at weight ratios varying from 1–4:1–4:1–4 based on weight of iron, manganese and zinc in the metal salts. The solutions in each of the FIGURES have a pH of approximately 3.0 and are acidified by the addition of concentrated sulfuric acid. The solubility relationships illustrated in the FIGURES, however, are applicable to all systems having pH values below about 4.0 and acidified by any strong mineral acid.

While any of the strong mineral acids can be used in reducing the pH of the fertilizer solutions of this invention, it is preferred that sulfuric, phosphoric, nitric, hydrohalic, i.e., hydrochloric, hydrobromic, hydroiodic, or hydrofluoric acids be employed. The amount of the mineral acid which is added to the solution can be from 0.05 to 5.0 weight percent and preferably from about 0.1 to about 2 weight percent, as required to provide a pH of the solution less than 4.0 and, preferably from 1.5 to 4.0. It is recognized, however, that phosphoric acid or nitric acid can be added in higher amounts to increase the major nutrient content of the eutectic solution. For example, phosphoric acid can be employed in a sufficient quantity to impart a $P_2O_5$ fertilizer content to the acidified urea solution from 1 to about 10 percent.

The preferred use of the aforementioned solutions comprises the foliar application of the solutions to crops late in the growing season, e.g., at a period within about 20 to 45 days prior to the harvesting. The solutions can be applied in undiluted concentration of, if desired, can be admixed with from 0.1 to about 100 gallons of water per gallon of the aforementioned solution. The solutions can be applied at dosages sufficient to provide from about 0.01 to about 0.5 pound of metal per acre, preferably from about 0.1 to about 0.2 pound of metal per acre, or in an amount to overcome the deficiency. In alternative applications, the solutions can be applied at the aforementioned dosages directly to the soil at any time prior to or during the growing season of the particular crop. In such uses the solutions are usually applied to the foliage or soil to correct known or suspected deficiencies of iron, manganese or zinc in the soil before a metal deficiency appears in the crop, however it is apparent that the solutions can be applied to the foliage or soil whenever the metals deficiency become apparent by an abnormal appearance of the crop.

The aforementioned solutions are compatible with most major nutrient solutions and can be blended therewith in any desired proportion. In one embodiment the aforementioned solutions can be blended with from about 1 to about 25 gallons per gallon of the major nutrient. Exemplary major nutrient solutions include aqueous solutions of ammonium nitrate, monopotassium orthophosphate, monoammonium orthophosphate, Uran, urea-formaldehyde solutions such as UF-85, ammonium phosphate solutions, and mixtures thereof. The aqueous urea solutions can also be mixed with various suspensions of supersaturated solutions of the aforementioned nutrient solutes or suspensions of various fertilizer solids such as triple superphosphate, superphosphate, acidulated and pulverized phosphate rock, etc.

In addition I have found that potassium can be conveniently added to the eutectic compositions of this invention in substantial quantities without substantially affecting the micronutrient solubilities. For example, potassium nutrients, such as KCl, $KNO_3$, $K_3PO_4$, etc., can be added to the acidified urea micronutrient solution in an amount sufficient to raise the $K_2O$ content of the fertilizer to approximately 5 percent. If phosphorous containing compounds are also added to the solution, it has been found that aqueous urea-micronutrient fertilizer solutions can be made having an N-P-K of 1–10% N, 1–10% $P_2O_5$ and 1–5% $K_2O$ without exceeding the solubilities of the micronutrient salts.

The invention is further illustrated by the following examples which are illustrative of specific embodiments of this invention and are not intended as limiting the scope of the invention as defined by the appended claims.

EXAMPLE 1

Several acidified eutectic solutions having a pH of less than about 4.0 are prepared in a series of five solubility tests. In each test 100 grams of a solution consisting of varying amounts of zinc sulfate with 50 percent aqueous solution is placed in a 250 milliliter glass vial. The pH of the solution is measured, and the salting out temperature of the zinc sulfate is determined. Four of the samples are then acidified with concentrated sulfuric acid to various pH values and the salting out temperature is again measured. The following table illustrates the results obtained from these tests.

TABLE I

Solubility of $ZnSO_4$

| Test | $ZnSO_4 \cdot 7H_2O$ (grams) | Urea-$H_2O$ (grams) | pH | Salting Out Temperature °F. |
|---|---|---|---|---|
| Nonacidified | | | | |
| 1 | 4.4 | 95.6 | 6.6 | <150° |
| 2 | 8.8 | 91.2 | 6.3 | <150° |
| 3 | 17.6 | 82.4 | 6.0 | <70° |
| 4 | 35.2 | 64.8 | 5.4 | ~70° |
| 5 | 70.4 | 29.6 | 5.2 | <150° |
| Acidified | | | | |
| 6 | 4.4 | 95.6 | 4.0 | 41° |
| 7 | 8.8 | 91.2 | 3.7 | 36° |
| 8 | 17.6 | 82.4 | 3.8 | 1° |
| 9 | 35.2 | 64.8 | 3.8 | −16° |

It is apparent from the above table that the reduction of the pH for the ternary solution resulted in a substantial increase in $ZnSO_4$ solubility as reflected by a reduction in the salting out temperature for the solution.

EXAMPLE 2

An eutectic composition is prepared by admixing 41.1 grams of water, 16.4 grams of urea, 16.7 grams of phosphoric acid, 11.4 grams of $KNO_3$, 8.8 grams of $ZnSO_4 \cdot 7H_2O$, 2.5 grams of $FeSO_4 \cdot 7H_2O$ and 3.1 grams of $MnSO_4 \cdot H_2O$. The solution has a salting out temperature below 0° C. and contains 2% Zn, 0.5% Fe, and 1% Mn. The solution also has a N-P-K value of 9% N, 9% $P_2O_4$ and 5% $K_2O$.

EXAMPLE 3

The following eutectic compositions are prepared by admixing ferrous sulfate, zinc sulfate and manganese sulfate in an aqueous urea solution having a pH of approximately 3.0 and acidified with concentrated sulfuric acid. These compositions have salting out temperatures below 20° C. and are shown in Table II.

TABLE II.—CONCENTRATION, WEIGHT PERCENT

| Solution | $FeSO_4$ | $ZnSO_4$ | $MnSO_4$ | Combination [1] | Urea | $H_2O$ |
|---|---|---|---|---|---|---|
| 1 | 5 | | | | 55 | 40 |
| 2 | 27 | | | | 40 | 33 |
| 3 | 31 | | | | 44 | 25 |
| 4 | 30 | | | | 25 | 45 |
| 5 | 23 | | | | 5 | 72 |
| 6 | | 10 | | | 55 | 35 |
| 7 | | 30 | | | 45 | 25 |
| 8 | | 32 | | | 48 | 20 |
| 9 | | 30 | | | 25 | 45 |
| 10 | | 35 | | | 5 | 60 |
| 11 | | | 5 | | 44 | 51 |
| 12 | | | 8 | | 52 | 40 |
| 13 | | | 27 | | 40 | 33 |
| 14 | | | 31 | | 40 | 29 |
| 15 | | | 38 | | 5 | 57 |
| 16 | | | | 5 | 54 | 41 |
| 17 | | | | 10 | 50 | 40 |
| 18 | | | | 25 | 46 | 29 |
| 19 | | | | 29 | 20 | 51 |
| 20 | | | | 28 | 5 | 67 |

[1] Combination of $FeSO_4$, $ZnSO_4$, and $MnSO_4$ in weight ratio of 1:1:1 based on Fe:Zn:Mn.

EXAMPLE 4

This example illustrates the application of solutions of this invention to plants and demonstrates the high absorptivity of the micronutrients into the plants from the solutions. Three acidified urea-micronutrient solutions (A, B and C) are prepared and applied to six, 3-year old orange trees each standing about 6 to 8 feet high. Leaves are taken from the trees before the application of the solution and also 41 days after application. These leaves are dried and analyzed for iron, manganese and zinc content to determine the relative increase in the metal content resulting from the application of the fertilizer solutions.

Solution A contains 8 percent iron, and is prepared by admixing 10 grams of $FeSO_4 \cdot 7H_2O$, 7.3 grams of urea, 0.5 gram of concentrated sulfuric acid and 0.01 gram of surfactant with 7.2 grams of water. Solution B contains 8 percent manganese, and is prepared by admixing 7.2 grams of $MnSO_4 \cdot H_2O$, 8.6 grams of urea, 0.5 gram of concentrated sulfuric acid and 0.01 gram of surfactant with 8.7 grams of water. Solution C contains 8 percent zinc, and is prepared by admixing 8.9 grams of $ZnSO_4 \cdot 7H_2O$, 8.25 grams of urea, 0.5 gram of concentrated sulfuric acid and 0.01 gram of surfactant with 7.3 grams of water.

The three solutions are each diluted with 1 liter of water, and 500 milliliters of each diluted solution are sprayed on the six trees. The results from these tests are shown in Table III.

TABLE III

| Treating Solution | Micronutrient Content (Parts Nontreated Leaves) | | | Micronutrient Absorption Per Million) Treated Leaves | | |
|---|---|---|---|---|---|---|
| | Mn | Fe | Zn | Mn | Fe | Zn |
| A | 38 | 57 | 30 | 38 | 160 | 30 |
| B | 38 | 57 | 30 | 115 | 57 | 30 |
| C | 38 | 57 | 30 | 38 | 57 | 82 |

It is apparent from the above table that the application of solutions A, B and C to the six, 3-year orange trees resulted in an iron, manganese and zinc micronutrient increase in the plants of 180, 200 and 170 percent, respectively.

The aforementioned illustrative compositions are not intended to unduly limit the invention, but rather it is intended that all obvious equivalents to such compositions which are described herein are within the scope of the invention.

I claim:

1. A fertilizer solution consisting essentially of water, at least one weight percent of a micronutrient solute selected from the class consisting of managanese sulfate, zinc sulfate and ferrous sulfate, at least five weight percent of urea solute and a sufficient quantity of mineral acid to impart to said solution a Ph of less than 4; the concentration of said solutes in said solution being (1) greater than the additive concentrations of an aqueous solution saturated at 0° C. with said micronutrient solute and an aqueous solution saturated at 0° C. with said urea solute, and (2) less than the salting out concentration at 20° C.

2. The fertilizer solution defined in claim 1 wherein said mineral acid is sulfuric, nitric or phosphoric acid.

3. The fertilizer solution defined in claim 1 wherein the pH of said solution is maintained between about 1.5 and 4.0.

4. The fertilizer solution defined in claim 1 wherein said solution has a salting out concentration at a temperature of less than 0° C.

5. The fertilizer solution defined in claim 1 wherein said micronutrient is present in an amount between about 1 and 35 weight percent, said urea is present in an amount between about 5 and 55 weight percent and said water is present in an amount between 20 and 60 weight percent.

6. An aqueous solution having a pH from about 1.5 to 4.0 and consisting essentially of from 1 to about 35 weight percent of a micronutrient solute selected from the group consisting of ferrous sulfate, manganese sulfate, zinc sulfate or mixtures thereof, from about 5 to about 55 weight percent of urea solute and from about 20 to about 60 weight percent water; the concentration of said solutes in said solution being greater than the additive concentrations of an aqueous solution saturated at 0° C. with said micronutrient solute and an aqueous solution saturated at 0° C. with said urea solute and less than the salting out concentration at a temperature of about 20° C.

7. The solution defined in claim 6 wherein said solution also contains a soluble potassium salt in a sufficient quantity to provide a $K_2O$ content in said solution of between 1 and 5 weight percent.

8. The solution defined in claim 6 wherein said solution also contains phosphoric acid in an amount sufficient to provide a $P_2O_5$ content in said solution of between about 1 and 10 weight percent.

9. The solution defined in claim 6 wherein said solution also contains soluble salts of potassium and phosphorus and has an N-P-K content between about 1–10 weight percent N, 1–10 weight percent $P_2O_4$ and 1–5 weight percent $K_2O$.

10. A solution comprising water, urea and at least one weight percent of a micronutrient selected from the group consisting of manganese sulfate, ferrous sulfate, zinc sulfate and mixtures thereof and having a pH between about 1.5 and 4.0; said solution having a salting out concentration at a temperature between about 0° C. and 20° C.

11. The solution defined in claim 10 wherein said micronutrient is ferrous sulfate and has a concentration enclosed by the urea defined by lines W–C, C–X, X–Y, Y–$C_1$, $C_1$–Z and Z–W of FIG. 1.

12. The solution defined in claim 10 wherein said micronutrient is manganese sulfate and has a concentration enclosed by the area defined by lines W–C, C–X, X–Y, Y–$C_1$, $C_1$–Z and Z–W of FIG. 2.

13. The solution defined in claim 10 wherein said micronutrient is zinc sulfate and has a concentration enclosed by the area defined by lines W–C, C–X, X–Y, Y–$C_1$, $C_1$–Z and Z–W of FIG. 3.

14. The solution defined in claim 10 wherein said micronutrient is a mixture of ferrous sulfate, zinc sulfate and manganese sulfate and has a concentration enclosed by the area defined by lines W–C, C–X, X–Y, Y–$C_1$, $C_1$–Z and Z–W of FIG. 4.

* * * * *